(12) United States Patent
Ayyadevara et al.

(10) Patent No.: US 11,741,381 B2
(45) Date of Patent: Aug. 29, 2023

(54) WEIGHTED ADAPTIVE FILTERING BASED LOSS FUNCTION TO PREDICT THE FIRST OCCURRENCE OF MULTIPLE EVENTS IN A SINGLE SHOT

(71) Applicant: Optum Technology, Inc., Eden Prairie, MN (US)

(72) Inventors: V Kishore Ayyadevara, Hyderabad (IN); Sree Harsha Ankem, Hyderabad (IN); Raghav Bali, Bangalore (IN); Rohan Khilnani, Hyderabad (IN); Vineet Shukla, Bangalore (IN); Saikumar Chintareddy, Hyderabad (IN); Ranraj Rana Singh, Thane (IN)

(73) Assignee: OPTUM TECHNOLOGY, INC., Eden Prairie, MN (US)

( * ) Notice: Subject to any disclaimer, the term of this patent is extended or adjusted under 35 U.S.C. 154(b) by 430 days.

(21) Appl. No.: 16/928,616

(22) Filed: Jul. 14, 2020

(65) Prior Publication Data

US 2022/0019913 A1   Jan. 20, 2022

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC ................................. G06N 5/04; G06N 20/00
See application file for complete search history.

(56) References Cited

U.S. PATENT DOCUMENTS

| | | |
|---|---|---|
| 8,825,304 B2 | 9/2014 | Horvitz et al. |
| 9,053,516 B2 | 6/2015 | Stempora |
| 9,296,395 B2 | 3/2016 | Forcke et al. |
| 10,009,738 B2 | 6/2018 | Shen et al. |
| 10,730,527 B2 | 8/2020 | Wang et al. |
| 10,907,986 B2 | 2/2021 | Balakrishna |
| 11,117,572 B2 | 9/2021 | Wang et al. |
| 2014/0095201 A1* | 4/2014 | Farooq .................. G16H 50/30 705/3 |

(Continued)

OTHER PUBLICATIONS

Si, "Deep Patient Representation of Clinical Notes via Multi-Task Learning for Mortality Prediction", AMIA, 2019. (Year: 2019).*

(Continued)

*Primary Examiner* — Dave Misir
(74) *Attorney, Agent, or Firm* — Alston & Bird LLP

(57) ABSTRACT

There is a need for more effective and efficient prediction data analysis. This need can be addressed by, for example, solutions for performing first-occurrence multi-disease prediction. In one example, a method includes determining a per-event-type loss value for each event type of a group of event types; determining a cross-event-type loss value based at least in part on each per-event-type loss value; training a multi-event-type prediction model based at least in part on the cross-event type loss value; generating a first-occurrence prediction based at least in part on the multi-event-type prediction model, wherein the first occurrence-prediction comprises a first-occurrence prediction item for each event type of the group of event types; and performing one or more prediction-based actions based at least in part on the first-occurrence prediction.

20 Claims, 14 Drawing Sheets

(56) References Cited

U.S. PATENT DOCUMENTS

| | | | |
|---|---|---|---|
| 2019/0129418 A1 | 5/2019 | Swan et al. | |
| 2020/0265273 A1* | 8/2020 | Wei | G06K 9/6268 |
| 2020/0320391 A1* | 10/2020 | Lanius | G06N 20/00 |
| 2020/0327404 A1* | 10/2020 | Miotto | G06N 3/0481 |
| 2021/0103771 A1* | 4/2021 | Aides | G06N 3/08 |
| 2021/0233658 A1* | 7/2021 | Van Assel | G16H 70/60 |
| 2021/0291650 A1 | 9/2021 | Minjeur et al. | |

OTHER PUBLICATIONS

Bayati, Mohsen et al. "A Low-Cost Method for Multiple Disease Prediction," In AMIA Annual Symposium Proceedings, vol. 2015, Nov. 5, 2015, pp. 329-338, American Medical Informatics Association.

Brisimi, Theodora S. et al. "Predicting Chronic Disease Hospitalizations From Electronic Health Records: An Interpretable Classification Approach." arXiv preprint, arXiv:1801.01204v1 [cs.LG] Jan. 3, 2018, pp. 1-40.

Eddy, Joseph. "Forecasting With Neural Networks—An Introduction to Sequence-to-Sequence Modeling of Time Series," May 11, 2018, (5 pages). [Retrieved from the Internet Oct. 13, 2020] <URL: https://jeddy92.github.io/JEddy92.github.io/ts_seq2seq_intro/>.

Kaushal, Vishal et al. "Learning From Less Data: Diversified Subset Selection and Active Learning In Image Classification Tasks." arXiv preprint arXiv:1805.11191 [cs.CV] May 28, 2018, pp. 1-15 pages.

Khan, S.H. et al. "Cost-Sensitive Learning of Deep Feature Representations From Imbalanced Data," Journal of Latex Class Files, vol. 6, No. 1, Jul. 2015. arXiv preprint, arXiv:1508.03422v3 [cs.CV] Mar. 23, 2017, pp. 1-15.

Tarlow, Daniel et al. "Structured Output Learning With High Order Loss Functions," In Artificial Intelligence and Statistics, Mar. 21, 2012, pp. 1212-1220.

Yu, Kezi et al. "Rare Disease Detection By Sequence Modeling With Generative Adversarial Networks." arXiv preprint, arXiv:1907.01022v1 [cs.LG] Jul. 1, 2019, (6 pages).

Hou, Lian et al. "Drivers' Braking Behaviors in Different Motion Patterns of Vehicle-Bicycle Conflicts," Journal of Advanced Transportation, vol. 2019, Article ID 4023970, Mar. 3, 2019, (17 pages), DOI: 10.1155/2019/4023970.

Seelye, Adriana et al. "Passive Assessment of Routine Driving With Unobtrusive Sensors: A New Approach for Identifying and Monitoring Functional Level in Normal Aging and Mold Cognitive Impairment," Journal of Alzheimer's Disease, vol. 59, No. 4, (Year: 2017), pp. 1427-1437, DOI: 10.3233/JAD-170116.

Yale, Steven H. et al. "Neurologic Conditions: Assessing Medical Fitness to Drive," Clinical Medicine & Research, vol. 1 No. 3, Jun. 6, 2003, pp. 177-188.

"Exercises for Older Driver Safety," Era Living, (5 pages), [Retrieved from the Internet Jun. 21, 2022] <URL: https://www.eraliving.com/blog/exercises-for-older-driver-safety/>.

Blackwell, Andrew D. et al. "Detecting Dementia: Novel Neuropsychological Markers of Preclinical Alzheimer's Disease," Dementia and Geriatric Cognitive Disorders, vol. 17, Nos. 1-2, Oct. 13, 2003, pp. 42-48, DOI: 10.1159/000074081.

* cited by examiner

| | 511 | | 512 | | | | | 513 | |
|---|---|---|---|---|---|---|---|---|---|
| | 521 | 522 | 531 | 532 | 533 | 534 | 541 | 542 | |
| | Member ID | Date of prediction considered while training the model | Historical Visits (ICD+NDC+ Lab Results) | Days since historical medical visits | Age | Gender | Diabetes Label | Kidney Failure Label | |
| 501 | 12345 | 2016-05-13 | [[585, 428, 404, 87932018][0, 0, 205, 038],[0, 410, 799, V04]...] | [[0], [0.9754682 7], [0.9324510 8]...] | 30 | 0 | 1 | 0 | |
| 502 | 12345 | 2017-08-19 | [[585, 428, 404, 87932018][0, 0, 205, 038],[0, 410, 799, V04]...] | [[0], [0.9754682 7], [0.9324510 8]...] | 30 | 0 | 2 | 1 | |

FIG. 5

| 601 | 602 | 603 | 604 |
|---|---|---|---|
| 0 | 1 | 0.65432 | 0.74396 |
| 2 | 1 | 0.11892 | 0.07834 |
| 1 | 0 | 0.25678 | 0.15672 |
| 1 | 2 | 0.38729 | 0.44398 |
| 0 | 1 | 0.78923 | 0.61982 |
| 2 | 1 | 0.89102 | 0.77213 |

```
                                                           404B
┌─────────────────────────────────────────────────────────┐
│ Determine an adjustment value for each event type       │
│ based on the field count for the event type and the     │
│ incidence rate penalty weight for the event type        │
│                       1101                              │
└─────────────────────────────────────────────────────────┘
                            │
                            ▼
┌─────────────────────────────────────────────────────────┐
│ Determine an adjusted loss value for each event type    │
│ based on the per-event-type loss value for the event    │
│ type and the adjustment value for the event type        │
│                       1102                              │
└─────────────────────────────────────────────────────────┘
                            │
                            ▼
┌─────────────────────────────────────────────────────────┐
│ Determine a combined loss value based on each           │
│ adjusted loss value                                     │
│                       1103                              │
└─────────────────────────────────────────────────────────┘
                            │
                            ▼
┌─────────────────────────────────────────────────────────┐
│ Determine a loss normalization factor based on each     │
│ adjustment value                                        │
│                       1104                              │
└─────────────────────────────────────────────────────────┘
                            │
                            ▼
┌─────────────────────────────────────────────────────────┐
│ Determine a normalized loss value based on the          │
│ combined loss value and the normalization factor        │
│                       1105                              │
└─────────────────────────────────────────────────────────┘
                            │
                            ▼
┌─────────────────────────────────────────────────────────┐
│ Determine the cross-event-type loss value based on      │
│ the normalized loss value                               │
│                       1106                              │
└─────────────────────────────────────────────────────────┘
```

FIG. 11

WEIGHTED ADAPTIVE FILTERING BASED LOSS FUNCTION TO PREDICT THE FIRST OCCURRENCE OF MULTIPLE EVENTS IN A SINGLE SHOT

BACKGROUND

Various embodiments of the present invention address technical challenges related to performing multi-event-type predictive data analysis. Various embodiments of the present invention address the shortcomings of existing prediction inference systems and disclose various techniques for efficiently and reliably performing multi-event-type predictive data analysis.

BRIEF SUMMARY

In general, embodiments of the present invention provide methods, apparatus, systems, computing devices, computing entities, and/or the like for performing first-occurrence multi-event-type predictive data analysis. Certain embodiments utilize systems, methods, and computer program products that utilize at least one of multi-event-type prediction models, training multi-event-type prediction models using per-event-type loss values, training multi-event-type prediction models using cross-event-type loss values, prospective timeframes, retrospective timeframes, and filtering of repeat-occurrence training data fields before training multi-event-type prediction models.

In accordance with one aspect, a method is provided. In one embodiment, the method comprises: identifying a plurality of training data fields, wherein each training data field of the plurality of training data fields is associated with a training input set and an event label set; processing each training input set for a training data field of the plurality of training data fields using a multi-event prediction model to determine an inferred event probability set for the training data field; for each event type of the plurality of event types: (i) determining a related subset of the plurality of training data fields for the event type, wherein a training data field is in the related subset if the event label set for the training data field describes that the training data field describes no-occurrence of the event type in relation to the training data field or first-occurrence of the event type in relation to the training data field; and (ii) determining a per-event-type loss value for the event type based at least in part on each event label set for a training data field in the related subset and each inferred event probability set for a training data field in the related subset; determining, based at least in part on each per-event-type loss value for an event type of the plurality of event types, a cross-event-type loss value; training the multi-event-type prediction model based at least in part on the cross-event type loss value; generating the first-occurrence prediction based at least in part on the multi-event-type prediction model, wherein the first occurrence-prediction comprises a first-occurrence prediction item for each event type of the plurality of event types; and performing one or more prediction-based actions based at least in part on the first-occurrence prediction.

In accordance with another aspect, a computer program product is provided. The computer program product may comprise at least one computer-readable storage medium having computer-readable program code portions stored therein, the computer-readable program code portions comprising executable portions configured to: identify a plurality of training data fields, wherein each training data field of the plurality of training data fields is associated with a training input set and an event label set; process each training input set for a training data field of the plurality of training data fields using a multi-event prediction model to determine an inferred event probability set for the training data field; for each event type of the plurality of event types: (i) determine a related subset of the plurality of training data fields for the event type, wherein a training data field is in the related subset if the event label set for the training data field describes that the training data field describes no-occurrence of the event type in relation to the training data field or first-occurrence of the event type in relation to the training data field; and (ii) determine a per-event-type loss value for the event type based at least in part on each event label set for a training data field in the related subset and each inferred event probability set for a training data field in the related subset; determine, based at least in part on each per-event-type loss value for an event type of the plurality of event types, a cross-event-type loss value; train the multi-event-type prediction model based at least in part on the cross-event type loss value; generate the first-occurrence prediction based at least in part on the multi-event-type prediction model, wherein the first occurrence-prediction comprises a first-occurrence prediction item for each event type of the plurality of event types; and perform one or more prediction-based actions based at least in part on the first-occurrence prediction.

In accordance with yet another aspect, an apparatus comprising at least one processor and at least one memory including computer program code is provided. In one embodiment, the at least one memory and the computer program code may be configured to, with the processor, cause the apparatus to: identify a plurality of training data fields, wherein each training data field of the plurality of training data fields is associated with a training input set and an event label set; process each training input set for a training data field of the plurality of training data fields using a multi-event prediction model to determine an inferred event probability set for the training data field; for each event type of the plurality of event types: (i) determine a related subset of the plurality of training data fields for the event type, wherein a training data field is in the related subset if the event label set for the training data field describes that the training data field describes no-occurrence of the event type in relation to the training data field or first-occurrence of the event type in relation to the training data field; and (ii) determine a per-event-type loss value for the event type based at least in part on each event label set for a training data field in the related subset and each inferred event probability set for a training data field in the related subset; determine, based at least in part on each per-event-type loss value for an event type of the plurality of event types, a cross-event-type loss value; train the multi-event-type prediction model based at least in part on the cross-event type loss value; generate the first-occurrence prediction based at least in part on the multi-event-type prediction model, wherein the first occurrence-prediction comprises a first-occurrence prediction item for each event type of the plurality of event types; and perform one or more prediction-based actions based at least in part on the first-occurrence prediction.

BRIEF DESCRIPTION OF THE DRAWINGS

Figure 1:
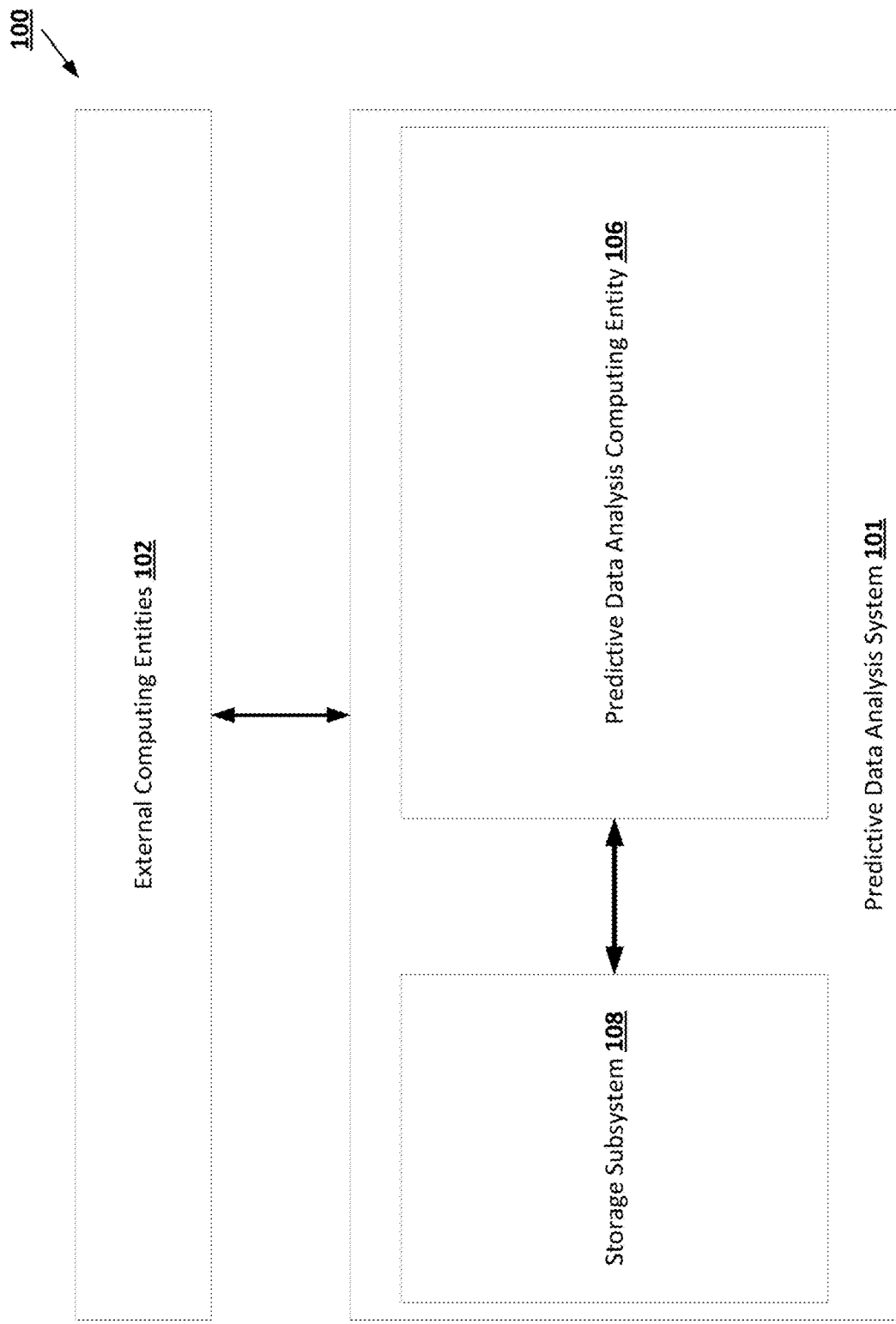

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
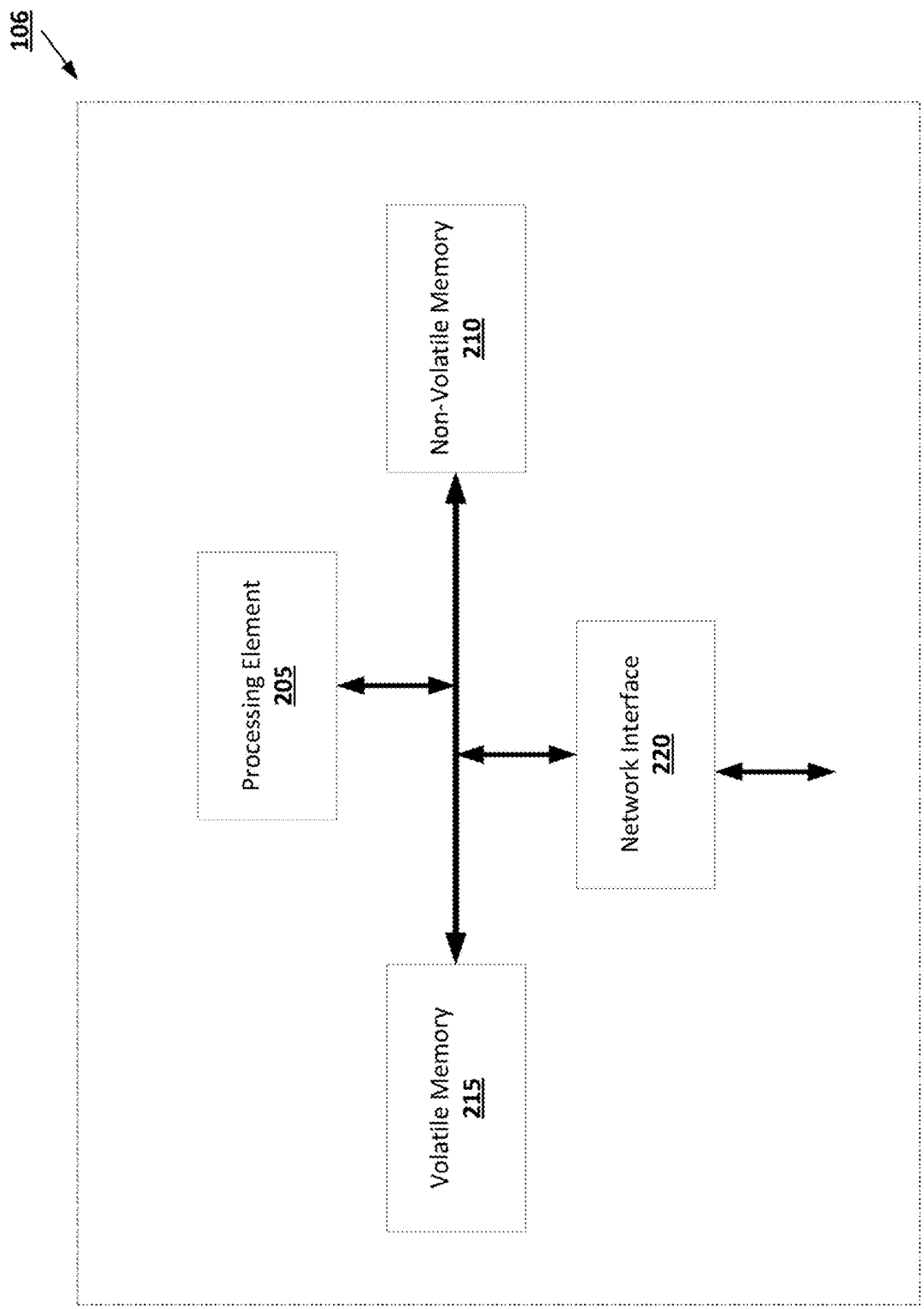

FIG. 2 provides an example prediction data analysis computing entity in accordance with some embodiments discussed herein.

Figure 3:
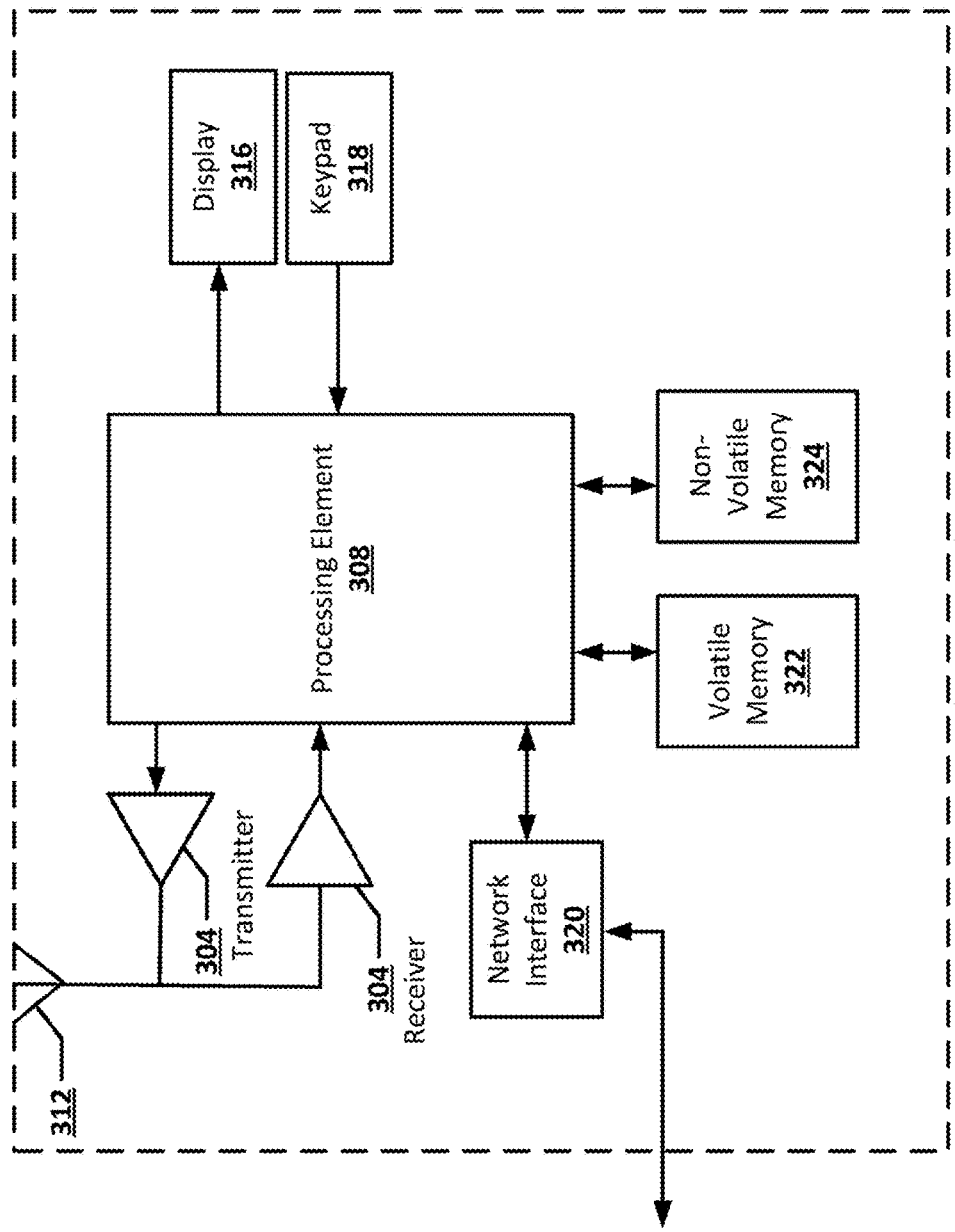

FIG. 3 provides an example external computing entity in accordance with some embodiments discussed herein.

Figure 4:
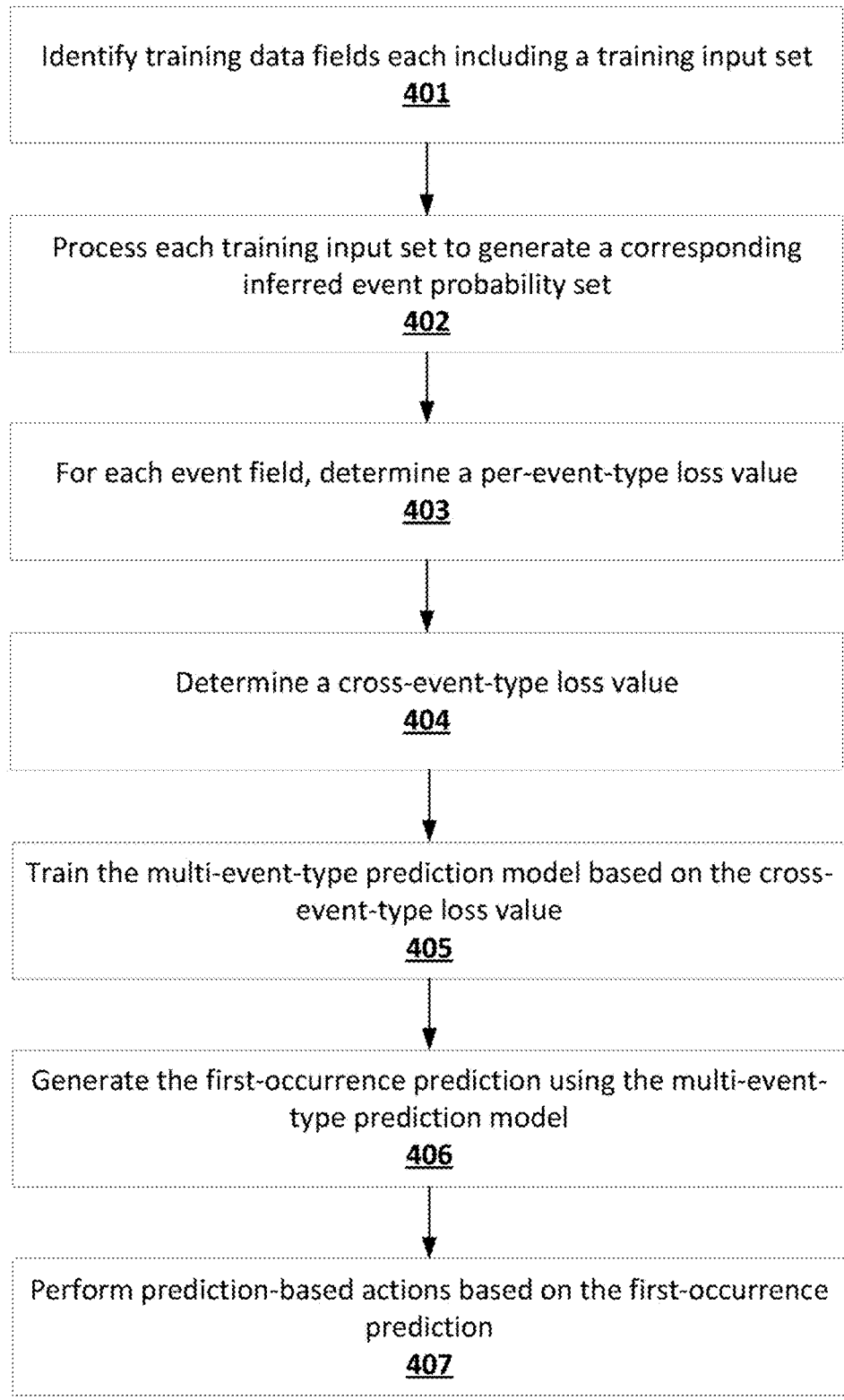

FIG. 4 is a flowchart diagram of an example process for generating a first occurrence prediction for a prediction input set in relation to a plurality of event types in accordance with some embodiments discussed herein.

FIG. 5 provides an operational example of two training data fields in accordance with some embodiments discussed herein.

FIG. 6 provides an operational example of an event probability inference data object in accordance with some embodiments discussed herein.

Figure 7:
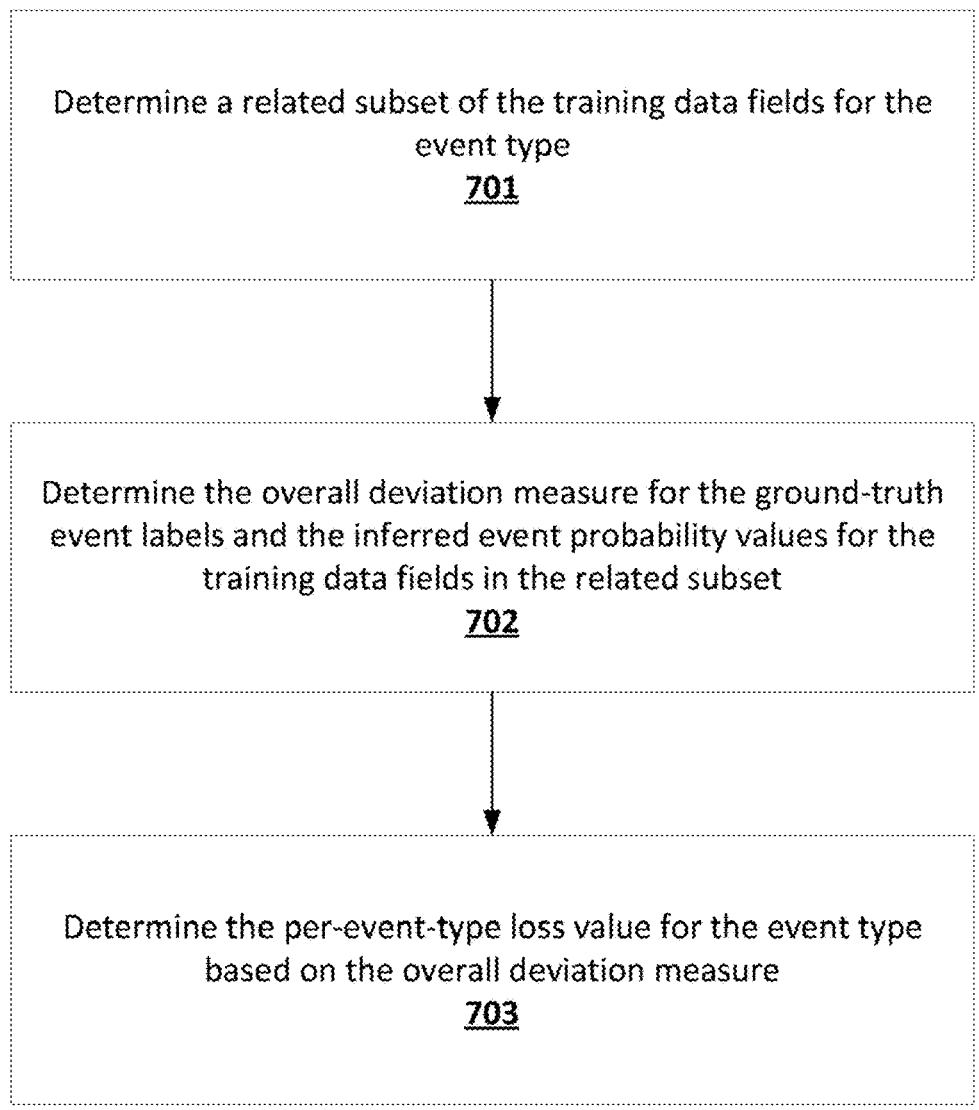

FIG. 7 is a flowchart diagram of an example process for determining a per-event-type loss value for an event type in accordance with some embodiments discussed herein.

Figure 8:
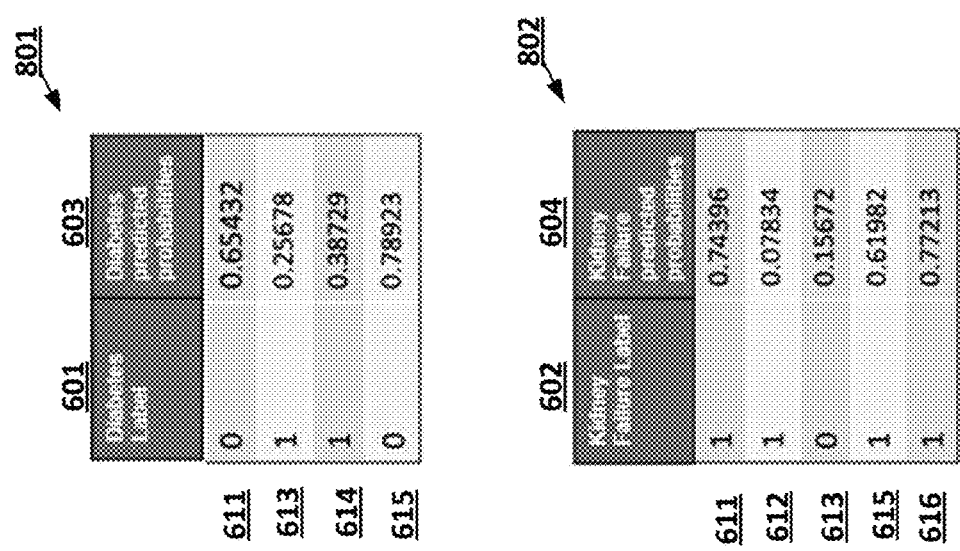

FIG. 8 provides an operational example of two per-event-type filtered data objects in accordance with some embodiments discussed herein.

Figure 9:
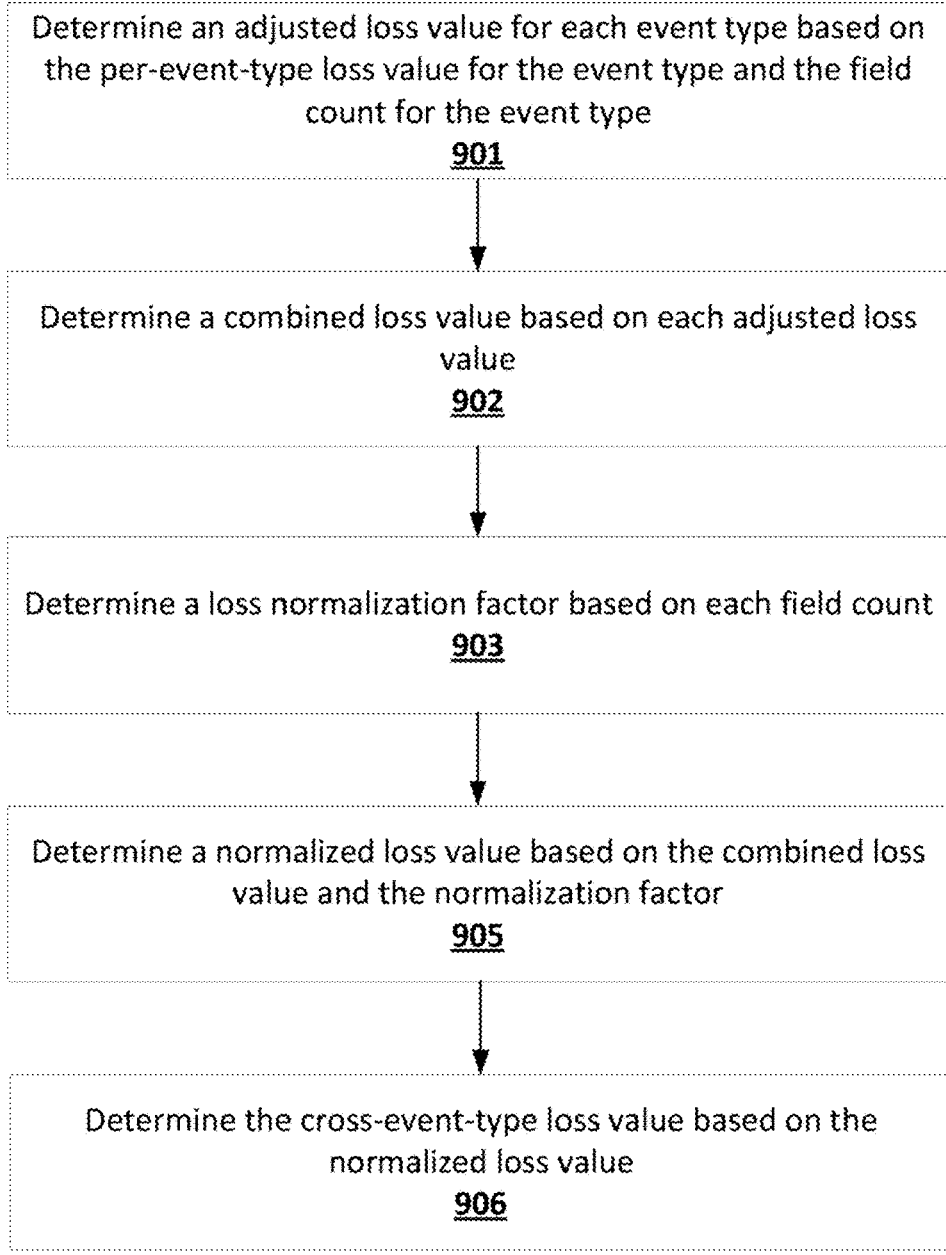

FIG. 9 is a flowchart diagram of an example process for determining a cross-event-type loss value using field count adjustments in accordance with some embodiments discussed herein.

Figure 10:
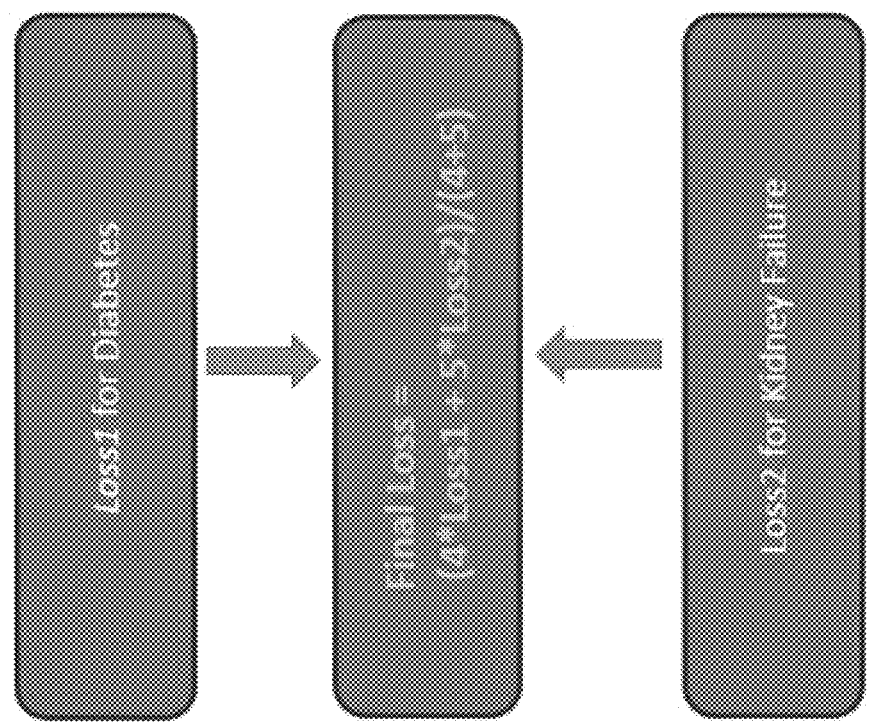

FIG. 10 provides an operational example of determining a cross-event-type loss value using field count adjustments in accordance with some embodiments discussed herein.

FIG. 11 is a flowchart diagram of an example process for determining a cross-event-type loss value using field count adjustments and incidence rate adjustments in accordance with some embodiments discussed herein.

Figure 12:
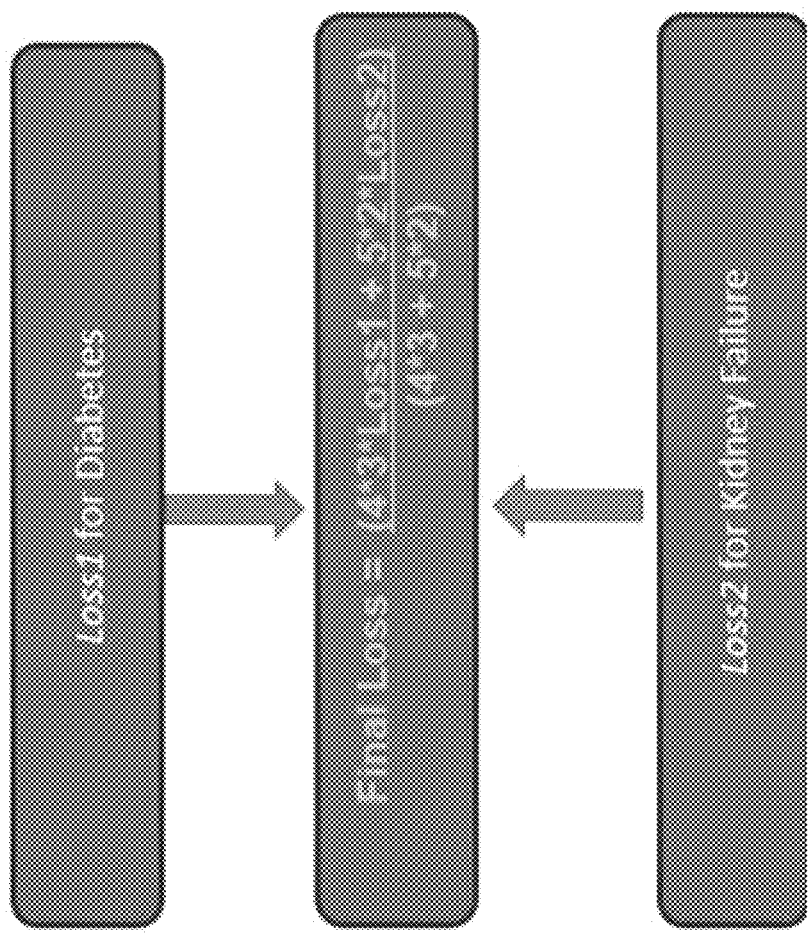

FIG. 12 provides an operational example of determining a cross-event-type loss value using field count adjustments incidence rate adjustments in accordance with some embodiments discussed herein.

Figure 13:
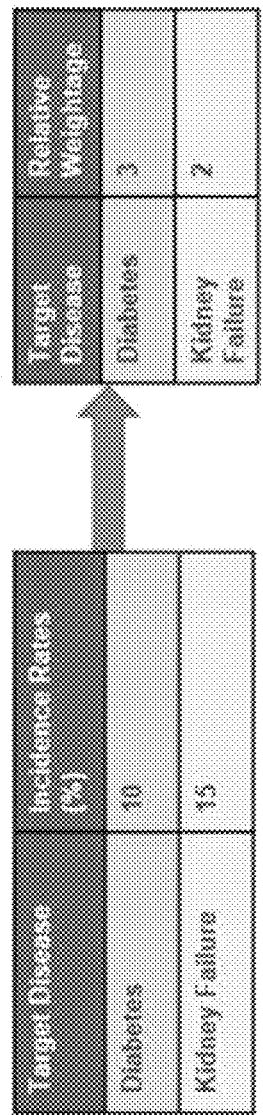

FIG. 13 provides an operational example of generating incidence rate penalty weight values in accordance with some embodiments discussed herein.

Figure 14:

FIG. 14 provides an operational example of a multi-disease prediction output user interface in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to prediction data analysis, one of ordinary skill in the art will recognize that the disclosed concepts can be used to perform other types of data analysis.

I. OVERVIEW

Various embodiments of the present invention make important technical contributions to efficiently and reliably perform multi-event-type prediction data analysis (e.g., multi-disease first-occurrence prediction data analysis) by introducing techniques for performing multi-event-type prediction data analysis using a single multi-event-type prediction model, rather than multiple per-event-type prediction models. Performing multi-event-type prediction data analysis using a single multi-event-type prediction model rather than multiple per-event-type prediction models is technologically advantageous for at least the following reasons: (1) training a single multi-event-type prediction model requires one training session while training multiple per-event-type prediction models requires multiple training sessions; thus, performing multi-event-type prediction data analysis using a single multi-event-type prediction model reduces computational costs of training machine learning frameworks used to perform multi-event-type prediction data analysis; and (2) once trained, a single trained multi-event-type prediction model typically has less parameter/hyper-parameter data than multiple trained per-event-type prediction models; thus, performing multi-event-type prediction data analysis using a single multi-event-type prediction models reduces storage complexity associated with storing parameter/hyper-parameter data of machine learning frameworks used to perform multi-event-type prediction data analysis. Accordingly, by disclosing techniques for efficiently and reliably performing multi-event-type prediction data analysis via performing multi-event-type prediction data analysis using a single multi-event-type prediction model, various embodiments of the present invention increase efficiency (including training efficiency and storage efficiency) and reliability of performing multi-event-type prediction data analysis.

Moreover, various embodiments of the present invention provide efficient and reliable techniques for integrating event incidence rate data during training of multi-event-types machine learning models. For example, various embodiments of the present invention introduce techniques for adjusting per-event-type loss values based on incidence rate penalty weight values for event types, where the incidence rate penalty weight values may be inversely proportional to incidence rates of event types. In some embodiments, the incidence rate penalty weight values are determined to penalize deviations between ground-truth event labels and inferred event probability values for less frequent event types relative to deviations between ground-truth event labels and inferred event probability values for more frequent event types. By utilizing incidence rate penalty weight values, various embodiments of the present invention provide efficient and reliable techniques for integrating event incidence rate data during training of multi-event-types machine learning models, which in turn enables more efficient and more reliable predictions on rare event types (e.g., rare diseases). In doing so, various embodiments of the present invention substantially advance the field of prediction data analysis and make important technical contributions to improving the effectiveness and accuracy of various existing multi-event-type prediction systems, e.g., various existing multi-disease prediction systems.

II. DEFINITIONS

The term "training data field" describes a data object that describes one or more input properties of a predictive entity along with one or more ground-truth event labels for the predictive entity, where each ground-truth event label for the predictive entity may describe whether the predictive entity is recorded to have experienced first-occurrence of a corresponding event type, repeat-occurrence of the corresponding event type, or no-occurrence of a corresponding event type. For example, a particular training data field may describe one or more properties of a patient predictive entity (e.g., medical visit history of the patient predictive entity, demographic information of the patient predictive entity, medical claim history of the patient predictive entity, prescription claim history and/or the like) along one or more ground-truth event labels each describing whether the patient predictive entity has experienced first occurrence of a corresponding disease during a specified prospective timeframe, repeat-occurrence of the corresponding disease during the specified prospective timeframe, or no-occurrence of the corresponding disease during the specified prospective timeframe. A training data field may include a training input set and an event label set, as described below.

The term "training input set" describes a data object that describes one or more input properties of a predictive entity as indicated by a corresponding training data field. The format of the training input set may be defined in accordance with an input structure of a machine learning model configured to be trained using the corresponding training data field, such as a multi-event-type prediction machine learning model. Examples of training input sets include collections of input values that describe at least one of medical visit histories of corresponding patient predictive entities, demographic information of corresponding patient predictive entities, and medical claim histories of corresponding patient predictive entities.

The term "event label set" describes a data object that describes one or more ground-truth event labels for a corresponding predictive entity as indicated by a corresponding training data field, where each ground-truth event label for the predictive entity describes whether the predictive entity is recorded to have experienced first-occurrence of a corresponding event type, repeat-occurrence of the corresponding event type, or no-occurrence of a corresponding event type. Examples of event label sets include collection of ground-truth values that describe whether corresponding patient predictive entities have experienced first-occurrences of particular diseases during specified prospective timeframes, repeat-occurrences of particular diseases during specified prospective timeframes, and no-occurrences of particular diseases during particular specified prospective timeframes.

The term "inferred event probability set" describes a data object that describes one or more inferred event probability values for a corresponding training data field, where the inferred event probability values include an inferred event probability value for each ground-truth event label described by the corresponding training data field, and where the inferred event probability values are determined by processing the training input sets associated with corresponding training data fields using a multi-event-type prediction model. For example, given a training data field that describes ground-truth event labels for two diseases, the inferred event probability set for the training data field may include an inferred event probability value for each of the two diseases.

The term "multi-event-type type prediction model" describes a data object that describes parameters and/or hyper-parameters of a machine learning framework that is configured to process input data associated with a predictive entity to determine two or more inferred event probabilities for the predictive entity, where the two or more inferred event probabilities include an inferred event probability for each respective event type of two or more event types. For example, a multi-event-type prediction model may describe a machine learning framework that is configured to process real-time patient data (e.g., patient visit history data, patient claim history data, patient demographic data, and/or the like) to generate first-occurrence probabilities for two or more disease types associated with the multi-event-type prediction model.

The term "per-event-type loss value" describes a data object that describes an overall deviation measure of: (i) inferred event probability values generated by a multi-prediction event prediction model in accordance with a group of training data fields associated with a corresponding event type, and (ii) ground-truth event labels for the group of training data fields that are associated with the corresponding event type, where the group of training data fields include training data fields that describe no-occurrence of the corresponding event type or first-occurrence of the corresponding event type, but not repeat-occurrence of the corresponding event type. For example, given two event types E1 and E2, and given two training data fields T1 and T2, if T1 has an inferred probability value of $P_1$ for E1 and an inferred probability value of $P_2$ for E2, and further if T2 has an inferred probability value of $P_3$ for E1 and inferred probability value of $P_4$ for E2, and further if T1 has a ground-truth event label of 2 denoting repeat-occurrence with respect to E1 and a ground-truth event label of 0 denoting no-occurrence with respect to E2, and further if T2 has a ground-truth event label of 1 denoting first-occurrence with respect to E1 and a ground-truth event label of 0 denoting no-occurrence with respect to E2, then: (i) the per-event-type loss value for E1 may be determined based at least in part on the deviation measure between $P_3$ and 1 and (ii) the per-event-type loss value for E2 may be determined based at least in part on a deviation measure between $P_2$ and 0 and a deviation measure between $P_4$ and 0. In some embodiments, a per-event-type loss value for an event type is a binary cross-entropy loss value determined based at least in part on the above-described overall deviation measure associated with the particular event type.

The term "cross-event-type loss value" describes a data object that describes an overall loss value for a multi-event-type prediction model across the two or more event types associated with the multi-event-type prediction model, where the overall loss value is determined based at least in part on each per-event-type loss value associated with an event type of the one or more event types. In some embodiments, the cross-event-type loss value for the two or more event types is determined based at least in part on a raw summation of each per-event-type loss value associated with an event type of the one or more event types. In some embodiments, the cross-event-type loss value for the two or more event types is determined based at least in part on a weighted summation of each per-event-type loss value associated with an event type of the one or more event types, where the pre-summation adjustment of a per-event-type loss value is determined based at least in part on at least one of the number of training data fields used to determine the per-event-type loss values and an incidence rate penalty weights for the event types associated with the per-event-type loss values.

The term "incidence rate penalty weight value" is a data object that describes a desired level of magnification in the per-event-type loss value for a corresponding event type before using the per-event-type loss value along with the per-event-type loss values for other event types in order to generate a cross-event-type loss value, where the desired level of magnification is determined in a manner that has an inverse relationship with an overall incidence rate (e.g., an observed overall incidence rate, an assumed overall incidence rate, and/or the like) of the event type among a population of predictive entities. Accordingly, the incidence rate penalty weight values may be determined in a manner configured to penalize deviations between ground-truth event labels and inferred event probability values for less frequent event types relative to more frequent event types.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing first-occurrence multi-event type prediction data analysis. The architecture 100 includes a prediction data analysis system 101 configured to receive prediction data analysis requests from external computing entities 102, process the prediction data analysis requests to generate predictions, provide the generated predictions to the external computing entities 102, and automatically perform prediction-based actions based at least in part on the generated predictions. An example of a prediction data analysis task is generating multi-disease predictions for patient predictive entities and/or performing responsive medical actions based at least in part on the generated multi-disease predictions.

In some embodiments, prediction data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The prediction data analysis system 101 may include a prediction data analysis computing entity 106 and a storage subsystem 108. The prediction data analysis computing entity 106 may be configured to receive prediction data analysis requests from one or more external computing entities 102, process the prediction data analysis requests to generate the generated predictions corresponding to the prediction data analysis requests, provide the generated predictions to the external computing entities 102, and automatically perform prediction-based actions based at least in part on the generated predictions.

The storage subsystem 108 may be configured to store input data used by the prediction data analysis computing entity 106 to perform prediction data analysis as well as model definition data used by the prediction data analysis computing entity 106 to perform various prediction data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Prediction Data Analysis Computing Entity

FIG. 2 provides a schematic of a prediction data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the prediction data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the prediction data analysis computing entity 106 may include or be in communication with one or more processing elements 205 (also referred to as processors, processing circuitry, and/or similar terms used herein interchangeably) that communicate with other elements within the prediction data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the prediction data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the prediction data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the prediction data analysis computing entity 106 with the assistance of the processing element 205 and operating system.

As indicated, in one embodiment, the prediction data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the prediction data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the prediction data analysis computing entity 106 may include or be in communication with one or more input elements, such as a keyboard input, a mouse input, a touch screen/display input, motion input, movement input, audio input, pointing device input, joystick input, keypad input, and/or the like. The prediction data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the prediction data analysis computing entity 106. In a particular embodiment, the external computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the prediction data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the prediction data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the prediction data analysis computing entity 106 and/or various other computing entities.

In another embodiment, the external computing entity 102 may include one or more components or functionality that are the same or similar to those of the prediction data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

FIG. 4 is a flowchart diagram of an example process 400 for generating a first occurrence prediction for a prediction input set in relation to a plurality of event types. Via the various steps/operations of the process 400, the prediction data analysis computing entity 106 can efficiently and reliably perform multi-event-type prediction using a single multi-event-type prediction model associated with a plurality of event types instead of multiple per-event-type prediction models, which in turn reduces the computational complexity of training machine learning frameworks configured to perform multi-event-type prediction as well as the storage complexity of storing parameter/hyper-parameter data of machine learning frameworks configured to perform multi-event-type prediction.

The process 400 begins at step/operation 401 when the prediction data analysis computing entity 106 identifies a plurality of training data fields. A training data field is a data object that describes one or more input properties of a predictive entity along with one or more ground-truth event labels for the predictive entity, where each ground-truth event label for the predictive entity may describe whether the predictive entity is recorded to have experienced first-occurrence of a corresponding event type, repeat-occurrence of the corresponding event type, or no-occurrence of a corresponding event type. For example, a particular training data field may describe one or more properties of a patient predictive entity (e.g., medical visit history of the patient predictive entity, demographic information of the patient predictive entity, medical claim history of the patient predictive entity, and/or the like) along one or more ground-truth event labels each describing whether the patient predictive entity has experienced first occurrence of a corresponding disease during a specified prospective timeframe, repeat-occurrence of the corresponding disease during the specified prospective timeframe, or no-occurrence of the corresponding disease during the specified prospective timeframe. A training data field may include a training input set and an event label set, as described below.

In some embodiments, each training data field includes a training input set. The training input set is a data object that describes one or more input properties of a predictive entity as indicated by a corresponding training data field. The format of the training input set may be defined in accordance with an input structure of a machine learning model configured to be trained using the corresponding training data field, such as a multi-event-type prediction machine learning model. Examples of training input sets include collections of input values that describe at least one of medical visit histories of corresponding patient predictive entities, demographic information of corresponding patient predictive entities, and medical claim histories of corresponding patient predictive entities.

In some embodiments, each training data field includes an event label set. The event label set is a data object that describes one or more ground-truth event labels for a corresponding predictive entity as indicated by a corresponding training data field, where each ground-truth event label for the predictive entity describes whether the predictive entity is recorded to have experienced first-occurrence of a corresponding event type, repeat-occurrence of the corresponding event type, or no-occurrence of a corresponding event type. Examples of event label sets include collection of ground-truth values that describe whether corresponding patient predictive entities have experienced first-occurrences of particular diseases during specified prospective timeframes, repeat-occurrences of particular diseases during specified prospective timeframes, and no-occurrences of particular diseases during particular specified prospective timeframes.

An operational example of training data fields 501-502 is presented in FIG. 5. As depicted in FIG. 5, each depicted training data field is associated with a prediction metadata set 511, a training input set 512, and an event label set 513. The prediction metadata set 511 includes a member identifier 521 and a prediction date descriptor 522. The member identifier 521 for a training data field describes a member predictive entity that is associated with the training data field. The prediction date descriptor 522 for a training data field describes a presumed prediction date according to which a retrospective timeframe for the training data field and a prospective timeframe for the training data field are inferred, as further defined below.

A retrospective timeframe is a data object that describes a predefined period of time before a presumed prediction date associated with a corresponding training data field, while a prospective timeframe is a data object that describes a predefined period of time after a presumed prediction date associated with a corresponding training data field. In the operational example of FIG. 5, the retrospective timeframe for a respective training data field includes the time period starting at twenty-four months prior to the presumed prediction date for the respective training data field as described by prediction date descriptor 522 for the training data field and continuing until the noted presumed prediction date. Moreover, the prospective timeframe for a respective training data field includes the time period starting at the presumed prediction date for the training data field as described by prediction date descriptor 522 for the respective training data field and continuing until n months after the presumed prediction date (where the prediction time window can be n number of months, where the value of n can be fine-tuned for a given application).

As further depicted in FIG. 5, the training input set 512 includes a historical visit subject descriptor 531, a historical visit time descriptor 532, an age descriptor 533, and a gender descriptor 534. The historical visit subject descriptor 531 for a respective training data field is a vector that includes a collection of each medical code list for a medical visit of the member identifier 521 associated with the training data field that falls within the retrospective timeframe, where the collection describes the medical code lists for the medical visits in accordance a particular medical visit order (e.g., a temporal medical visit order, a cross-temporal medical visit order, a duration-wise medical visit order, and/or the like), and where each medical code list for a medical visit describes a zero-padded list of the medical codes (e.g., diagnosis codes such as International Statistical Classification of Diseases and Related Health Problems (ICD) codes, drug codes such as National Drug Codes (NDCs), and lab result codes) associated with the medical visit. The historical visit time descriptor 532 for a respective training data field is a vector that describes a collection of each temporally-encoded floating point value for a medical visit of the member identifier 521 associated with the training data field that falls within the retrospective timeframe, where the collection describes the temporally-encoded floating point values for the medical visits in accordance the particular medical visit order of the historical visit subject descriptor 531, and where each temporally-encoded floating point value for a medical visit describes a relative oldness of a visit date associated with the medical visit as a floating point value. The age descriptor 533 for a training data field describes a recorded age of the member identifier 521 associated with the training data field as of the presumed prediction date for the training data field, while the gender descriptor 534 for a training data field describes a recorded gender of the member identifier 521 associated with the training data field as of the presumed prediction date for the training data field.

As further depicted in FIG. 5, the event label set 513 for a training data field includes two per-event-type event labels: a diabetes event label 541 and a kidney-failure event label 542. Each per-event-type event label for a corresponding training data field describes whether a corresponding event type (i.e., the diabetes event type for the diabetes event label 541 and the kidney-failure event type for the kidney-failure event label 542) has occurred in neither the retrospective timeframe for the corresponding training data field nor the prospective timeframe for the corresponding training data field and thus describes no-occurrence of the corresponding event type, or the corresponding event type has not occurred in the retrospective timeframe for the corresponding training data field but has occurred in the prospective timeframe for the corresponding training data field and thus describes first-occurrence of the corresponding event type, or the corresponding event type has occurred in the retrospective timeframe for the corresponding training data field and thus describes repeat-occurrence of the corresponding event type.

In particular, as depicted in the training data field 501 of FIG. 5, the member identifier 12345 has a value of one for the diabetes event label 541 describing first-occurrence for the diabetes event type and a value of zero for the kidney-failure event label 542 describing no-occurrence of the kidney-failure event type. This means that the member identifier 12345 has not experienced diabetes in the retrospective timeframe for the training data field 501 (i.e., May 13, 2014 to May 13, 2016) but has experienced diabetes in the prospective timeframe for the training data field 501 (i.e., May 13, 2016 to Aug. 13, 2016). This further means that the member identifier 12345 has not experienced diabetes in either the retrospective timeframe for the training data field 501 or the prospective timeframe for the training data field 501.

Moreover, as depicted in the training data field 502 of FIG. 5, the member identifier 12345 has a value of two for the diabetes event label 541 describing repeat-occurrence for the kidney-failure event type and a value of one for the kidney-failure event label 542 describing no-occurrence of the kidney-failure event type. This means that the member identifier 12345 has experienced diabetes in the retrospective timeframe for the training data field 502 (i.e., Aug. 19, 2015 to Aug. 19, 2017). This further means that the member identifier 12345 has not experienced kidney-failure in the retrospective timeframe for the training data field 501 but has experienced kidney-failure in the prospective timeframe of the training data field 502 (i.e., Aug. 19, 2017 to Nov. 19, 2017).

Returning to FIG. 4, at step/operation 402, the prediction data analysis computing entity 106 processes the plurality of training data fields using the multi-event-type prediction model to generate an inferred event probability set for each training data field of the plurality of training data fields. The inferred event probability set is a data object that describes one or more inferred event probability values for a corresponding training data field, where the inferred event probability values include an inferred event probability value for each ground-truth event label described by the corresponding training data field, and where the inferred event probability values are determined by processing the training input set associated with the corresponding training data field using a multi-event-type prediction model. For example, given a training data field that describes ground-truth event labels for two diseases, the inferred event probability set for the training data field may include an inferred event probability value for each of the two diseases.

The multi-event-type type prediction model is a data object that describes parameters and/or hyper-parameters of a machine learning framework that is configured to process input data associated with a predictive entity to determine two or more inferred event probabilities for the predictive entity, where the two or more inferred event probabilities include an inferred event probability for a respective event type. For example, a multi-event-type prediction model may describe a machine learning framework that is configured to process real-time patient data (e.g., patient visit history data, patient claim history data, patient demographic data, and/or the like) to generate first-occurrence probabilities for two or more disease types associated with the multi-event-type prediction model.

An operational example of an event probability inference data object 600 is depicted in FIG. 6. As depicted in FIG. 6, the event probability inference data object 600 includes six non-header rows each associated with a training data field. The first two columns of the event probability inference data object 600 describe per-event-type event labels for a diabetes event type and a kidney failure event type.

In particular, column 601 of the event probability inference data object 600 of FIG. 6 describes the per-event-type event label for the diabetes event type, while column 602 describes the per-event-type event label for the kidney-failure event type. Accordingly, as depicted in FIG. 6, the training data field corresponding to the first non-header row 611 describes no-occurrence of a corresponding predictive entity with respect to the diabetes event type and first-occurrence of a corresponding predictive entity with respect to the kidney-failure event type; the training data field corresponding to the second non-header row 612 describes repeat-occurrence of a corresponding predictive entity with respect to the diabetes event type and first-occurrence of a corresponding predictive entity with respect to the kidney-failure event type; the training data field corresponding to the third non-header row 613 describes first-occurrence of a corresponding predictive entity with respect to the diabetes event type and no-occurrence of a corresponding predictive entity with respect to the kidney-failure event type; the training data field corresponding to the fourth non-header row 614 describes first-occurrence of a corresponding predictive entity with respect to the diabetes event type and repeat-occurrence of a corresponding predictive entity with respect to the kidney-failure event type; the training data field corresponding to the fifth non-header row 615 describes no-occurrence of a corresponding predictive entity with respect to the diabetes event type and first-occurrence of a corresponding predictive entity with respect to the kidney-failure event type; and the training data field corresponding to the sixth non-header row 616 describes repeat-occurrence of a corresponding predictive entity with respect to the diabetes event type and first-occurrence of a corresponding predictive entity with respect to the kidney-failure event type.

As further depicted in FIG. 6, the latter two columns of the event probability inference data object 600 describe inferred event probability values for the diabetes event type and the kidney failure event type. In particular, column 603 describes the per-event-type inferred event probability values for the diabetes event type, while column 604 describes the per-event-type inferred event probability values for the kidney-failure event type.

Accordingly, as depicted in FIG. 6, the first non-header row 611 is associated with a diabetes-related inferred event probability value of 0.65432 and a kidney-failure-related inferred event probability value of 0.74396; the second non-header row 612 is associated with a diabetes-related inferred event probability value of 0.11892 and a kidney-failure-related inferred event probability value of 0.07834; the third non-header row 613 is associated with a diabetes-related inferred event probability value of 0.25678 and a kidney-failure-related inferred event probability value of 0.15672; the fourth non-header row 614 is associated with a diabetes-related inferred event probability value of 0.38729 and a kidney-failure-related inferred event probability value of 0.61982; the fifth non-header row 615 is associated with a diabetes-related inferred event probability value of 0.78923 and a kidney-failure-related inferred event probability value of 0.61982; and the sixth non-header row 616 is associated with a diabetes-related inferred event probability value of 0.89102 and a kidney-failure-related inferred event probability value of 0.77213.

Returning to FIG. 4, at step/operation 403, the prediction data analysis computing entity 106 generates a per-event-type loss value for each event type of the plurality of event types. A per-event-type loss value is a data object that describes an overall deviation measure of: (i) inferred event probability values generated by a multi-prediction event prediction model in accordance with a group of training data fields associated with a corresponding event type, and (ii) ground-truth event labels for the group of training data fields that are associated with the corresponding event type, where the group of training data fields include training data fields that describe no-occurrence of the corresponding event type or first-occurrence of the corresponding event type, but not repeat-occurrence of the corresponding event type.

For example, given two event types E1 and E2, and given two training data fields T1 and T2, if T1 has an inferred probability value of $P_1$ for E1 and an inferred probability value of $P_2$ for E2, and further if T2 has an inferred probability value of $P_3$ for E1 and inferred probability value of $P_4$ for E2, and further if T1 has a ground-truth event label of 2 denoting repeat-occurrence with respect to E1 and a ground-truth event label of 0 denoting no-occurrence with respect to E2, and further if T2 has a ground-truth event label of 1 denoting first-occurrence with respect to E1 and a ground-truth event label of 0 denoting no-occurrence with respect to E2, then: (i) the per-event-type loss value for E1 may be determined by the deviation measure between $P_3$ and 1; and (ii) the per-event-type loss value for E2 may be determined by a weighted average of the deviation measure between $P_2$ and 0 and a deviation measure between $P_4$ and 0. In some embodiments, a per-event-type loss value for an event type is a binary cross-entropy loss value determined based at least in part on the above-described overall deviation measure associated with the particular event type.

In some embodiments, step/operation 403 may be performed in relation to an event type in accordance with the process depicted in FIG. 7. The process depicted in FIG. 7 begins at step/operation 701 when the prediction data analysis computing entity 106 determines a related subset of the plurality of training data fields for the event type. In some embodiments, a training data field is in the related subset for the event type if the event label set for the training data field describes that the training data field describes no-occurrence of the event type in relation to the training data field or first-occurrence of the event type in relation to the training data field.

In some embodiments, to determine the related subset for an event type, the prediction data analysis computing entity 106 excludes/filters all training data fields that describe repeat-occurrence of the event type. In some embodiments, each event label of the plurality of event labels for a training data field of the plurality of training data fields describes no-occurrence of the event type associated with the event label if neither the retrospective timeframe for the training data field nor the prospective timeframe for the training data field describes ground-truth occurrence of the event type. In some embodiments, each event label of the plurality of event labels for a training data field of the plurality of training data fields describes first-occurrence of the event type associated with the event label if only the prospective timeframe for the training data field describes ground-truth occurrence of the event type. In some embodiments, each event label of the plurality of event labels for a training data field of the plurality of training data fields describes repeat-occurrence of the event type associated with the event label if both the retrospective timeframe for the training data field and the prospective timeframe for the training data field describe ground-truth occurrence of the event type.

In some embodiments, determining the related subset for an event type of the plurality of event types comprises: for each training data field of the plurality of training data fields, determining a related event label of the plurality of event labels for the training data field that is associated with the event type; and excluding from the plurality of training data fields any training data field whose related event label describes repeat-occurrence of the event type in relation to the training data field. In some embodiments, each event label set for a training field of the plurality of training fields comprises a plurality of event labels for the training data field, each event label of the plurality of event labels for a training data field of the plurality of training data fields is associated with an event type of the plurality of event types, and each event label of the plurality of event labels for a training data field of the plurality of training data fields describes one of no-occurrence of the event type associated with the event label in relation to the training data field, first-occurrence of the event type associated with the event label in relation to the training data field, and repeat-occurrence of the event type associated with the event label in relation to the training data field.

An operational example of two per-event-type filtered data objects 801-802 that each describe related training data fields for a related event type is depicted in FIG. 8. As depicted in FIG. 8, the per-event-type filtered data object 801 for the diabetes event type includes information from the first non-header row 611, the third non-header row 613, the fourth non-header row 614, and the fifth non-header row 615 of the event probability inference data object 600 of FIG. 5, because the remaining non-header rows of the event probability inference data object 600 (i.e., the second non-header row 612 and the sixth non-header row 615) describe repeat-occurrence of the diabetes event type.

As further depicted in FIG. 8, the per-event-type filtered data object 802 for the kidney-failure event type includes information from the first non-header row 611, the second non-header row 612, the third non-header row 613, the fifth non-header row 615, and the sixth non-header row 616 of the event probability inference data object 600 of FIG. 5, because the remaining non-header rows of the event probability inference data object 600 (i.e., the fourth non-header row 614) describe repeat-occurrence of the kidney-failure event type.

Returning to FIG. 7, at step/operation 702, the prediction data analysis computing entity 106 generates an overall deviation measure for the related subset associated with the event type. The overall deviation measure may be determined by combining each per-data-field deviation measure for a training data field in the related subset, where the per-data-field deviation measure for a training data field in the related subset may be determined based at least in part on a deviation measure (e.g., a squared deviation measure) of the ground-truth event label for the training data field and the inferred event probability value for the training data field. For example, the overall deviation measure for the event type may be determined by summing each per-data-field deviation measure for a training data field in the related subset, where the per-data-field deviation measure for a training data field in the related subset may be determined based at least in part on a squared deviation measure of the ground-truth event label for the training data field and the inferred event probability value for the training data field.

At step/operation 703, the prediction data analysis computing entity 106 generates the per-event-type loss value for the event type based at least in part on the overall deviation measure for the event type. In some embodiments, the prediction data analysis computing entity 106 adopts the overall deviation measure for the event type as the per-event-type loss value for the event type. In some embodiments, the prediction data analysis computing entity 106 generates a binary cross-entropy loss value for the event type based at least in part on the overall deviation measure for the event type. In some embodiments, the prediction data analysis computing entity 106 processes the overall deviation measure for the event type using one or more defined operations (e.g., using a trained machine learning model, such as a trained neural network model) to generate the per-event-type for the event type.

Returning to FIG. 4, at step/operation 404, the prediction data analysis computing entity 106 determines a cross-event-type loss value for the plurality of event types based at least in part on each per-event-type loss value for an event type of the plurality of event types. The cross-event-type loss value is a data object that describes an overall loss value for a multi-event-type prediction model across the two or more event types associated with the multi-event-type prediction model, where the overall loss value is determined based at least in part on each per-event-type loss value associated with an event type of the one or more event types. In some embodiments, the cross-event-type loss value for the two or more event types is determined based at least in part on a raw summation of each per-event-type loss value associated with an event type of the one or more event types. In some embodiments, the cross-event-type loss value for the two or more event types is determined based at least in part on an adjusted summation of each per-event-type loss value associated with an event type of the one or more event types, where the pre-summation adjustment of a per-event-type loss value is determined based at least in part on at least one of the number of training data fields used to determine the per-event-type loss value and an incidence rate penalty weight for the event type associated with the per-event-type loss value.

In some embodiments, determining the cross-event-type loss value comprises, for each event type of the plurality of event types, determining an adjusted loss value based at least in part on the per-event-type loss value for the event type and a field count of the related subset associated with the event type; determining a combined loss value based at least in part on each adjusted loss value for an event type of the plurality of event types; determining a loss normalization factor based at least in part on each field count for an event type of the plurality of event types; determining a normalized loss value based at least in part on the combined loss value and the loss normalization factor; and determining the cross-event-type loss value based at least in part on the normalized loss value. In some of the noted embodiments, determining each adjusted loss value for an event type of the plurality of event types comprises determining an incidence rate penalty weight for the event type based at least in part on an overall incidence rate of the event type; and determining the adjusted loss value for the event type based at least in part on the per-event-type loss value for the event type, the field count of the related subset for the event type, and the incidence rate penalty weight for the event type.

In some embodiments, step/operation 404 may be performed in accordance with the process depicted in FIG. 9. The process depicted in FIG. 9 begins at step/operation 901 when the prediction data analysis computing entity 106 determines an adjusted loss value for each event type of the plurality of event types based at least in part on the per-event-type type for the event type and the field count of the related subset of the plurality of training data fields associated with the event type (i.e., the number of training data fields in the subset of the plurality of training data fields that was used to determine the per-event-type type for the event type). In some embodiments, to generate the adjusted loss value for an event type, the prediction data analysis computing entity 106 multiplies the per-event-type type for the event type and the field count for the noted event type.

For example, as depicted in the operational example of FIG. 10, the prediction data analysis computing entity 106 multiplies Loss1, which is the per-event-type loss value for the diabetes event type, by 4, which is the number of fields of the per-event-type filtered data object 801 that is associated with the diabetes event type, to generate the adjusted loss value for the diabetes event type. Moreover, as depicted in the operational example of FIG. 10, the prediction data analysis computing entity 106 multiplies Loss2, which is the per-event-type loss value for the kidney-failure event type, by 5, which is the number of fields of the per-event-type filtered data object 802 that is associated with the kidney-failure event type, to generate the adjusted loss value for the kidney-failure event type.

At step/operation 902, the prediction data analysis computing entity 106 determines a combined loss value based at least in part on each adjusted loss value for an event type of the plurality of event types. In some embodiments, subsequent to determining each adjusted loss value for an event type of the plurality of event types based at least in part on the per-event-type type for the event type and the field count of the related subset of the plurality of training data fields associated with the event type, the prediction data analysis computing entity 901 combines (e.g., sums up) the determined adjusted loss values to determine the combined loss value. For example, as depicted in the operational example of FIG. 10, the prediction data analysis computing entity 106 sums up the adjusted loss value for the diabetes event type (i.e. Loss1*4) and the adjusted loss value for the kidney-failure event type (i.e., Loss2*5) to determine the combined loss value for both the diabetes event type and the kidney-failure event type.

At step/operation 903, the prediction data analysis computing entity 106 determines a loss normalization factor based at least in part on each field count for an event type of the plurality of event types. As noted above, the field count of an event type is a data object that describes the number of training data fields in the subset of the plurality of training data fields that was used to determine the per-event-type type for the event type. In some embodiments, subsequent to determining each field count for an event type of the plurality of event types, the prediction data analysis computing entity 106 determines the loss normalization factor by combining (e.g., summing up) each field count for an event type of the plurality of event types. For example, as depicted in the operational example of FIG. 10, the prediction data analysis computing entity 106 sums up the field count for the diabetes event type (i.e., 4) with the field count for the kidney-failure event type (i.e., 5) to determine the loss normalization factor.

At step/operation 904, the prediction data analysis computing entity 106 determines a normalized loss value based at least in part on the combined loss value and the loss normalization factor. In some embodiments, subsequent to determining the combined loss value and the loss normalization factor, the prediction data analysis computing entity 106 determines the normalized loss value based at least in part on the combined loss value and the loss normalization factor. For example, as depicted in FIG. 10, the prediction data analysis computing entity 106 may divide the combined loss value (i.e., Loss1*4+Loss2*5) by the loss normalization factor (i.e., 4+5) to determine the normalized loss value.

At step/operation 905, the prediction data analysis computing entity 106 determines the cross-event-type loss value based at least in part on the normalized loss value. In some embodiments, subsequent to determining the normalized loss value, the prediction data analysis computing entity 106 adopts the normalized loss value as the cross-event-type loss value. In some embodiments, the prediction data analysis computing entity 106 performs one or more adjustment operations (e.g., in accordance with a trained loss aggregation model) to the normalized loss value to generate the cross-event-type loss value.

In some embodiments, step/operation 404 may be performed in accordance with the process depicted in FIG. 11. The process depicted in FIG. 11 begins at step/operation 1101 when the prediction data analysis computing entity 106 determines an adjustment value for each event type of the plurality of event types based at least in part on the field count for the event type and an incidence rate penalty weight for the event type. In some embodiments, to determine the adjustment value for an event type, the prediction data analysis computing entity 106 multiplies the field count for the event type by the incidence rate penalty weight for the event type. For example, as depicted in FIG. 12, the prediction data analysis computing entity 106 determines an adjustment value for the diabetes event type by multiplying the field count for the diabetes event type (i.e., 4) by the incidence rate penalty weight for the event type for the diabetes event type (i.e., 3). Moreover, as further depicted in FIG. 12, the prediction data analysis computing entity 106 determines an adjustment value for the kidney-failure event type by multiplying the field count for the kidney-failure event type (i.e., 5) by the incidence rate penalty weight for the event type for the kidney-failure event type (i.e., 2).

The incidence rate penalty weight value is a data object that describes a desired level of magnification in the per-event-type loss value for a corresponding event type before using the per-event-type loss value along with the per-event-type loss values for other event types in order to generate a cross-event-type loss value, where the desired level of magnification is determined in a manner that has an inverse relationship with an overall incidence rate (e.g., an observed overall incidence rate, an assumed overall incidence rate, and/or the like) of the event type among a population of predictive entities. Accordingly, the incidence rate penalty weight values may be determined in a manner configured to penalize deviations between ground-truth event labels and inferred event probability values for less frequent event types relative to more frequent event types. An operational example of generating incidence rate penalty weight values is depicted in FIG. 13. As depicted in FIG. 13, given that the diabetes event type is deemed rarer than the kidney-failure event type, the diabetes event-type is assigned a higher incidence rate penalty weight value relative to the incidence rate penalty weight value of the kidney-failure event-type.

Returning to FIG. 11, at step/operation 1102, the prediction data analysis computing entity 106 determines an adjusted loss value for each event type based at least in part on the per-event-type loss value for the event type and the adjustment value for the event type. In some embodiments, subsequent to determining the adjustment value for an event type, the prediction data analysis computing entity 106 multiplies the adjustment value for the event type by the per-event-type loss value for the event type to determine the adjusted loss value for the event type.

For example, as depicted in FIG. 12, the prediction data analysis computing entity 106 multiplies Loss1, which is the per-event-type loss value for the diabetes event type, by 4*3, which is the adjustment value for the diabetes event type, to generate the adjusted loss value for the diabetes event type. Moreover, as depicted in the operational example of FIG. 10, the prediction data analysis computing entity 106 multiplies Loss2, which is the per-event-type loss value for the kidney-failure event type, by 5*2, which is the adjustment value for the kidney-failure event type, to generate the adjusted loss value for the kidney-failure event type.

At step/operation 1103, the prediction data analysis computing entity 106 determines a combined loss value based at least in part on each adjusted loss value for an event type of the plurality of event types. In some embodiments, subsequent to determining each adjusted loss value for an event type of the plurality of event types based at least in part on the per-event-type type for the event type and the field count of the related subset of the plurality of training data fields associated with the event type, the prediction data analysis computing entity 901 combines (e.g., sums up) the determined adjusted loss values to determine the combined loss value. For example, as depicted in the operational example of FIG. 10, the prediction data analysis computing entity 106 sums up the adjusted loss value for the diabetes event type (i.e. Loss1*4*3) and the adjusted loss value for the kidney-failure event type (i.e., Loss2*5*2) to determine the combined loss value for both the diabetes event type and the kidney-failure event type.

At step/operation 1104, the prediction data analysis computing entity 106 determines a loss normalization factor based at least in part on each adjustment value for an event type of the plurality of event types. In some embodiments, subsequent to determining each adjustment value for an event type of the plurality of event types, the prediction data analysis computing entity 106 determines the loss normalization factor by combining (e.g., summing up) each adjustment value for an event type of the plurality of event types. For example, as depicted in the operational example of FIG. 10, the prediction data analysis computing entity 106 sums up the adjustment value for the diabetes event type (i.e., 4*3) with the adjustment value for the kidney-failure event type (i.e., 5*2) to determine the loss normalization factor.

At step/operation 1105, the prediction data analysis computing entity 106 determines a normalized loss value based at least in part on the combined loss value and the loss normalization factor. In some embodiments, subsequent to determining the combined loss value and the loss normalization factor, the prediction data analysis computing entity 106 determines the normalized loss value based at least in part on the combined loss value and the loss normalization factor. For example, as depicted in FIG. 10, the prediction data analysis computing entity 106 may divide the combined loss value (i.e., Loss1*4*3+Loss2*5*2) by the loss normalization factor (i.e., 4*3+5*2) to determine the normalized loss value.

At step/operation 1106, the prediction data analysis computing entity 106 determines the cross-event-type loss value based at least in part on the normalized loss value. In some embodiments, subsequent to determining the normalized loss value, the prediction data analysis computing entity 106 adopts the normalized loss value as the cross-event-type loss value. In some embodiments, the prediction data analysis computing entity 106 performs one or more adjustment operations (e.g., in accordance with a trained loss aggregation model) to the normalized loss value to generate the cross-event-type loss value.

Returning to FIG. 4, at step/operation 405, the prediction data analysis computing entity 106 trains the multi-event-type prediction model based at least in part on the cross-event type loss value. In some embodiments, the prediction data analysis computing entity 106 updates parameters of the multi-event-type prediction model in order to minimize the cross-event-type loss value. In some embodiments, to update parameters of the multi-event prediction model to minimize the cross-event-type loss value, the multi-event-type prediction model utilizes a training algorithm that uses a local optimization method or a global optimization method, such as gradient descent and/or gradient descent with backpropagation.

At step/operation 406, the prediction data analysis computing entity 106 determines the first-occurrence prediction by processing the prediction input set using the trained multi-event prediction model. The prediction input set may include input properties of a new predictive entity, such as combination of at least one of medical visit data, medical claim data, and demographic data for a patient predictive entity. The first-occurrence prediction is a data object that describes whether the predictive entity is likely to experience first-occurrence of each of two or more event types in a prospective timeframe (e.g., in the next three months). For example, the first-occurrence prediction may describe whether a patient predictive entity is likely to experience diabetes in the next three months and/or likely to experience kidney failure in the next three months. In some embodiments, the first occurrence-prediction comprises a first-occurrence prediction item for each event type of the plurality of event types.

At step/operation 407, the prediction data analysis computing entity 106 performs one or more prediction-based actions based at least in part on the first-occurrence prediction. Examples of prediction-based actions include automated physician notifications, automated patient notifications, automated medical appointment scheduling, automated drug prescription recommendation, automated drug prescription generation, automated implementation of precautionary actions, automated hospital preparation actions, automated insurance workforce management operational management actions, automated insurance server load balancing actions, automated call center preparation actions, automated hospital preparation actions, automated insurance plan pricing actions, automated insurance plan update actions, and/or the like.

In some embodiments, performing the one or more prediction-based actions includes generating a multi-event-type prediction output interface that describes the first-occurrence prediction item for each event type of the plurality of event types, such as the multi-disease prediction user interface 1400 of FIG. 14 that provides a first-occurrence prediction item 1402 for each disease of a group of target diseases 1401. The diseases described by the multi-disease prediction user interface 1400 may be those whose first-occurrence predictions exceed a likelihood threshold. Moreover, the diseases described by the multi-disease prediction user interface 1400 may be ranked according to the magnitudes of deviation of the first-occurrence predictions of the diseases from the likelihood threshold. Accordingly, in some embodiments, more likely diseases may be ranked higher than less likely diseases. In the multi-disease prediction user interface 1400 of FIG. 14, the prediction window may be any number of months, and a prediction window of three months is merely an example of a prediction window.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
identifying, by one or more processors, a plurality of training data fields, wherein a training data field of the plurality of training data fields is associated with a training input set and an event label set;
determining, by the one or more processors, an inferred event probability set for the training data field of the plurality of training data fields using a multi-event-type prediction model and based at least in part on the training input set associated with the training data field, wherein (i) the multi-event-type prediction model is trained based at least in part on a cross-event type loss value that is determined based at least in part on a per-event-type loss value for an event type of a plurality of event types, (ii) the per-event-type loss value for the event type is determined based at least in part on (a) an event label set for the training data field in one or more related subsets of the plurality of training data fields for the event type and (b) the inferred event probability set for the training data field in the one or more related subsets, and (iii) a related subset of the one or more related subsets of the plurality of training data fields for the event type comprises those training data fields of the plurality of training data fields having an event label set that indicates the training data field describes no-occurrence of the event type or first-occurrence of the event type in relation to the training data field;
generating, by the one or more processors, a first-occurrence prediction based at least in part on the multi-event-type prediction model, wherein the first-occurrence prediction comprises a first-occurrence prediction item for the event type of the plurality of event types; and
initiating, by the one or more processors, the performance of one or more prediction-based actions based at least in part on the first-occurrence prediction.

2. The computer-implemented method of claim 1, wherein:
(i) the event label set for a training field of the plurality of training fields comprises a plurality of event labels for the training data field,
(ii) an event label of the plurality of event labels for the training data field of the plurality of training data fields is associated with an event type of the event type, and
(iii) the event label of the plurality of event labels for the training data field of the plurality of training data fields describes one of (a) no-occurrence of the event type associated with the event label in relation to the training data field, (b) first-occurrence of the event type associated with the event label in relation to the training data field, or (c) repeat-occurrence of the event type associated with the event label in relation to the training data field.

3. The computer-implemented method of claim 2, wherein determining the related subset for the event type of the plurality of event types comprises:
for the training data field of the plurality of training data fields, determining a related event label of the plurality of event labels for the training data field that is associated with the event type; and
excluding from the plurality of training data fields any training data field having a related event label that describes repeat-occurrence of the event type in relation to the training data field.

4. The computer-implemented method of claim 2, wherein:
(iv) the training data field of the plurality of training data fields is associated with a retrospective timeframe and a prospective timeframe,
(v) an event label describes no-occurrence of the event type associated with the event label when neither the retrospective timeframe for the training data field nor the prospective timeframe for the training data field describes ground-truth occurrence of the event type,
(vi) the event label describes first-occurrence of the event type associated with the event label when only the prospective timeframe for the training data field describes ground-truth occurrence of the event type, and
(vii) the event label describes repeat-occurrence of the event type associated with the event label when both the retrospective timeframe for the training data field and the prospective timeframe for the training data field describe ground-truth occurrence of the event type.

5. The computer-implemented method of claim 1, wherein determining the cross-event-type loss value comprises:
for the event type of the plurality of event types, determining an adjusted loss value based at least in part on the per-event-type loss value for the event type and a field count of the related subset associated with the event type;
determining a combined loss value based at least in part on each adjusted loss value for the event type of the plurality of event types;
determining a loss normalization factor based at least in part on each field count for the event type of the plurality of event types;
determining a normalized loss value based at least in part on the combined loss value and the loss normalization factor; and
determining the cross-event-type loss value based at least in part on the normalized loss value.

6. The computer-implemented method of claim 5, wherein determining each adjusted loss value for the event type of the plurality of event types comprises:
determining an incidence rate penalty weight for the event type based at least in part on an overall incidence rate of the event type; and
determining the adjusted loss value for the event type based at least in part on the per-event-type loss value for the event type, the field count of the related subset for the event type, and the incidence rate penalty weight for the event type.

7. The computer-implemented method of claim 6, wherein the loss normalization factor is determined based at least in part on the field count for the event type and the incidence rate penalty weight for the event type.

8. The computer-implemented method of claim 1, wherein the per-event-type loss value for the event type comprises a binary cross-entropy loss value.

9. The computer-implemented method of claim 1, wherein initiating the performance of the one or more prediction-based actions comprises generating a multi-event-type prediction output interface that describes the first-occurrence prediction for the event type.

10. The computer-implemented method of claim 9, wherein initiating the performance of the one or more prediction-based actions comprises causing the multi-event-type prediction output interface to be displayed on a provider portal.

11. An apparatus comprising one or more processors and at least one memory including program code, the at least one memory and the program code configured to, with the one or more processors, cause the apparatus to at least:
identify a plurality of training data fields, wherein a training data field of the plurality of training data fields is associated with a training input set and an event label set;
determine an inferred event probability set for the training data field of the plurality of training data fields using a multi-event-type prediction model and based at least in part on the training input set associated with the training data field,
wherein (i) the multi-event-type prediction model is trained based at least in part on a cross-event type loss value that is determined based at least in part on a per-event-type loss value for an event type of a plurality of event types, (ii) the per-event-type loss value for the event type is determined based at least in part on (a) an event label set for the training data field in one or more related subsets of the plurality of training data fields for the event type and (b) the inferred event probability set for the training data field in the one or more related subsets, and (iii) a related subset of the one or more related subsets of the plurality of training data fields for the event type comprises those training data fields of the pluralith of training data fields having an event label set that indicates the training data field describes no-occurrence of the event type or first-occurrence of the event type in relation to the training data field;
generate a first-occurrence prediction based at least in part on the multi-event-type prediction model, wherein the first-occurrence prediction comprises a first-occurrence prediction item for the one or more event types of the plurality of event types; and
initiate the performance of one or more prediction-based actions based at least in part on the first-occurrence prediction.

12. The apparatus of claim 11, wherein:
(i) the event label set for a training field of the plurality of training fields comprises a plurality of event labels for the training data field,
(ii) an event label of the plurality of event labels for the training data field of the plurality of training data fields is associated with an event type of the event type, and
(iii) the event label of the plurality of event labels for the training data field of the plurality of training data fields describes one of (a) no-occurrence of the event type associated with the event label in relation to the training data field, (b) first-occurrence of the event type associated with the event label in relation to the training data field, or (c) repeat-occurrence of the event type associated with the event label in relation to the training data field.

13. The apparatus of claim 12, wherein determining the related subset for the event type of the plurality of event types comprises:
for the training data field of the plurality of training data fields, determining a related event label of the plurality of event labels for the training data field that is associated with the event type; and
excluding from the plurality of training data fields any training data field whose having a related event label that describes repeat-occurrence of the event type in relation to the training data field.

14. The apparatus of claim 12, wherein:
(iv) the training data field of the plurality of training data fields is associated with a retrospective timeframe and a prospective timeframe,
(v) an event label of the plurality of event labels for a training data field of the plurality of training data fields describes no-occurrence of the event type associated with the event label when neither the retrospective timeframe for the training data field nor the prospective timeframe for the training data field describes ground-truth occurrence of the event type,
(vi) the event label describes first-occurrence of the event type associated with the event label when only the prospective timeframe for the training data field describes ground-truth occurrence of the event type, and
(vii) the event label describes repeat-occurrence of the event type associated with the event label when both the retrospective timeframe for the training data field and the prospective timeframe for the training data field describe ground-truth occurrence of the event type.

15. The apparatus of claim 11, wherein determining the cross-event-type loss value comprises:
for the event type of the plurality of event types, determining an adjusted loss value based at least in part on the per-event-type loss value for the event type and a field count of the related subset associated with the event type;
determining a combined loss value based at least in part on each adjusted loss value for the event type of the plurality of event types;
determining a loss normalization factor based at least in part on each field count for the event type of the plurality of event types;
determining a normalized loss value based at least in part on the combined loss value and the loss normalization factor; and
determining the cross-event-type loss value based at least in part on the normalized loss value.

16. At least one non-transitory computer-readable storage medium having computer-readable program code portions stored therein, the computer-readable program code portions configured to:
identify a plurality of training data fields, wherein a training data field of the plurality of training data fields is associated with a training input set and an event label set;
determine an inferred event probability set for the training data field of the plurality of training data fields using a multi-event-type prediction model and based at least in part on the training input set associated with the training data field,
wherein (i) the multi-event-type prediction model is trained based at least in part on a cross-event-type loss value that is determined based at least in part on a per-event-type loss value for an event type of a plurality of event types, (ii) the per-event-type loss value for the event type is determined based at least in part on (a) an event label set for the training data field in one or more related subsets of the plurality of training data fields for the event type and (b) the inferred event probability set for the training data field in the one or more related subsets, and (iii) a related subset of the one or more related subsets of the plurality of training data fields for the event type comprises those training data fields of the plurality of training data fields having an event label set that indicates the training data field describes no-occurrence of the event type or first-occurrence of the event type in relation to the training data field;
generate a first-occurrence prediction based at least in part on the multi-event-type prediction model, wherein the first-occurrence prediction comprises a first-occurrence prediction item for the event type of the plurality of event types; and
initiate the performance of one or more prediction-based actions based at least in part on the first-occurrence prediction.

17. The at least one non-transitory computer-readable storage medium of claim 16, wherein:
(i) the event label set for a training field of the plurality of training fields comprises a plurality of event labels for the training data field,
(ii) an event label of the plurality of event labels for the training data field of the plurality of training data fields is associated with an event type of the event type, and
(iii) the event label of the plurality of event labels for the training data field of the plurality of training data fields describes one of (a) no-occurrence of the event type associated with the event label in relation to the training data field, (b) first-occurrence of the event type associated with the event label in relation to the training data field, or (c) repeat-occurrence of the event type associated with the event label in relation to the training data field.

18. The at least one non-transitory computer-readable storage medium of claim 17, wherein determining the related subset for the event type of the plurality of event types comprises:
for the training data field of the plurality of training data fields, determining a related event label of the plurality of event labels for the training data field that is associated with the event type; and
excluding from the plurality of training data fields any training data field whose having a related event label that describes repeat-occurrence of the event type in relation to the training data field.

19. The at least one non-transitory computer-readable storage medium of claim 17, wherein:
- (iv) a training data field of the plurality of training data fields is associated with a retrospective timeframe and a prospective timeframe,
- (v) an event label describes no-occurrence of the event type associated with the event label when neither the retrospective timeframe for the training data field nor the prospective timeframe for the training data field describes ground-truth occurrence of the event type,
- (vi) the event label describes first-occurrence of the event type associated with the event label when only the prospective timeframe for the training data field describes ground-truth occurrence of the event type, and
- (vii) the event label describes repeat-occurrence of the event type associated with the event label when both the retrospective timeframe for the training data field and the prospective timeframe for the training data field describe ground-truth occurrence of the event type.

20. The at least one non-transitory computer-readable storage medium of claim 16, wherein determining the cross-event-type loss value comprises:

for the event type of the plurality of event types, determining an adjusted loss value based at least in part on the per-event-type loss value for the event type and a field count of the related subset associated with the event type;

determining a combined loss value based at least in part on each adjusted loss value for the event type of the plurality of event types;

determining a loss normalization factor based at least in part on each field count for the event type of the plurality of event types;

determining a normalized loss value based at least in part on the combined loss value and the loss normalization factor; and determining the cross-event-type loss value based at least in part on the normalized loss value.

* * * * *

UNITED STATES PATENT AND TRADEMARK OFFICE
CERTIFICATE OF CORRECTION

PATENT NO. : 11,741,381 B2
APPLICATION NO. : 16/928616
DATED : August 29, 2023
INVENTOR(S) : V Kishore Ayyadevara et al.

It is certified that error appears in the above-identified patent and that said Letters Patent is hereby corrected as shown below:

In the Claims

In Column 28, Line 43, Claim 11, delete "cross-event type" and insert -- cross-event-type --, therefor.

In Column 28, Line 55, Claim 11, delete "pluralith" and insert -- plurality --, therefor.

In Column 29, Line 26, Claim 13, delete "whose having" and insert -- having --, therefor.

In Column 29, Lines 33-34, Claim 14, delete "an event label of the plurality of event labels for a training data field of the plurality of training data fields" and insert -- an event label --, therefor.

In Column 30, Line 67, Claim 18, delete "whose having" and insert -- having --, therefor.

Signed and Sealed this
Thirtieth Day of January, 2024

*Katherine Kelly Vidal*

Katherine Kelly Vidal
*Director of the United States Patent and Trademark Office*